US00RE36484E

United States Patent [19]

Turner

[11] E Patent Number: Re. 36,484

[45] Reissued Date of Patent: Jan. 11, 2000

[54] STRING SUPPORT FOR STRINGED INSTRUMENT

[75] Inventor: William T. Turner, Chino Hills, Calif.

[73] Assignee: Intertune, Inc., El Cerrito, Calif.

[21] Appl. No.: 08/557,391

[22] Filed: Nov. 8, 1995

Related U.S. Patent Documents

Reissue of:

[64] Patent No.: 5,260,504
Issued: Nov. 9, 1993
Appl. No.: 07/909,557
Filed: Jul. 6, 1992

[51] Int. Cl.[7] ..... G10D 3/00

[52] U.S. Cl. ..... 84/297 R; 84/307; 84/314 N

[58] Field of Search ..... 84/297 R, 314 N, 84/307, 308, 309, 298

[56] References Cited

U.S. PATENT DOCUMENTS

| | | | |
|---|---|---|---|
| 2,191,776 | 2/1940 | Schreiber | 84/314 |
| 2,959,085 | 11/1960 | Porter | 84/314 |
| 3,599,524 | 8/1971 | Jones | 84/312 |
| 4,304,163 | 12/1981 | Siminoff | 84/314 |
| 4,385,543 | 5/1983 | Shaw et al. | 84/298 |
| 4,457,201 | 7/1984 | Storey | 84/313 |
| 4,625,613 | 12/1986 | Steinberger | 84/298 |
| 4,632,005 | 12/1986 | Steinberger | 84/298 |
| 4,709,612 | 12/1987 | Wilkinson | 84/314 |
| 5,173,565 | 12/1992 | Gunn | 84/298 |
| 5,438,901 | 8/1995 | Sperzel | 84/297 R |

FOREIGN PATENT DOCUMENTS 3996 of 1899 United Kingdom .

*Primary Examiner*—Stanley J. Witkowski
*Attorney, Agent, or Firm*—Skjerven, Morrill, MacPherson, Franklin & Friel LLP

[57] ABSTRACT

A nut (30) and/or saddle (20) supports the strings (14) of a stringed musical instrument (10) allowing essentially fully unrestricted movement of the strings, both forward and [background] *backward* within the nut or saddle in order to maintain the proper pitch tuning of each string. Each string is retained at a fixed position at the nut or saddle, but allowed to move freely from these fixed positions when the strings are in motion such as when being tuned. A pair of freely-[rotatably] *rotatable* ball bearings (34a and 34b) are positioned in a countersunk pocket aperture 33 in the nut housing (32) and/or saddle housing (60) and in the case of the former, are positioned immediately juxtaposed to a pressure pad (41) for dampening each string from vibration between the nut assembly and the instrument tuner mechanism. A retainer (42) retains each pair of balls (34a and 34b) in the pocket aperture (33).

19 Claims, 4 Drawing Sheets

STRING SUPPORT FOR STRINGED INSTRUMENT

Matter enclosed in heavy brackets [ ] appears in the original patent but forms no part of this reissue specification; matter printed in italics indicates the additions made by reissue.

FIELD OF THE INVENTION

This invention relates to a string support for a stringed instrument such as a guitar. More particularly the invention is directed to a guitar saddle and/or guitar nut which permits essentially unrestricted sliding of the string to facilitate and maintain accurate tuning of the instrument.

BACKGROUND OF THE INVENTION

The nut elements of a musical instrument are designed to support a series of strings at the neck end of the instrument. A series of bridge saddles form part of an instrument bridge on the body of the instrumental. The saddles are located at a bridge end which is opposite to the neck end. The saddles also support and allow for tuning adjustment of the strings.

Traditionally, conventional nut elements have consisted of a small rectangular bar fixedly positioned a fixed distance from the instrument bridge and extending above the fingerboard. The strings rest in tension in the nut to give string spacing above the fingerboard. The bar contains a series of grooves or slots in which strings of varying diameters are retained within the slots. To facilitate and maintain accurate tuning of the instrument, the strings must slide easily within the grooves of the nut and saddle. This also allows each string to slide forward and backward freely within its nut and saddle when the instrument utilizes a pivoting tremolo device at the bridge end of the instrument. The drawback of a conventional nut and conventional saddle is that often the strings will bind or constrict within the grooves of the nut, resisting needed movement to maintain tuning accuracy or when performing with a tremolo mechanism. Particularly, when the strings are constrained within the nut, it is difficult to properly tune and maintain consistent tuning of the instrument.

Alternative nut or saddle materials such as plastics, plastic composites including Teflon plastic and/or graphite have been employed, but these materials suffer significant frictional fatigue from repeated frictional string movement and must be replaced at regular intervals. It is further apparent that in the process of this frictional wear it becomes difficult to maintain the tuning accuracy of the instrument over time.

A nut for a string instrument is shown in U.S. Pat. No. 4,709,612 (Wilkinson) in which a series of roller elements are journalled within an elongated bore hole of a nut housing. The roller elements are confined to minimal increments of free rotational travel. Each of the roller elements is comprised of a series of cylindrical slugs which vary in diameter and come to rest at the bottom of the elongated axial bore hole in the nut housing. When the roller element is set into motion by a moving string, the roller element moves eccentrically within the bore hole effectively "rocking" within the confines of the bore walls. The roller attempts to climb the walls of the bore in the process of rolling forward or backward in conjunction with the motion of the string. When the roller element reaches the point of the upper most acclivity of the bore hole, the roller is forced against the wall of the bore hole and is inhibited from further free rotational movement, i.e., it jams. Since the roller may no longer rotate freely at this point, the string then frictionally drags over the roller element for the remainder of its forward motion. It is also seen in Wilkinson that as the diameter of the roller elements is increased in relation to the bore hole fixed diameter, that the length of free rotation of the larger roller elements within the bore hole decreases significantly. Further, it is noted that any minimum lateral motion of the string across a roller element may bring the string in contact with its respective groove or slot, which causes the string to vibrate against the slot wall creating unwanted buzzing or rattling in normal musical use. Additionally, the end-to-end mounted rollers can become canted changing the limits of travel and cause excessive frictional contact.

U.S. Pat. No. 2,191,776 (Schreiber) employs a series of grooved rollers which are journalled on a central shaft or axle. This configuration dictates that the rollers and their corresponding strings will lie in a horizontal plane across the surface of the nut. No provision is made to accommodate the height or spacing of the strings in relation to the convex curvature of a cambered fingerboard. Secondly, a roller may be easily offset toward a roller bearing wall through lateral string tension and may frictionally contact the wall of the housing, impeding roller movement. Thirdly, rollers will have a tendency to rattle against the bearing walls in the housing when a string is vibrating in a normal musical use.

U.S. Pat. No. 4,625,613 (Steinberger) shows an adjustable bridge which employs a series of saddles for supporting the strings. Each saddle includes cylindrically-shaped metal insert with a surrounding recess or groove for supporting a corresponding single string. U.S. Pat. No. 4,457,201 (Storey) shows saddle rollers of cylindrical shape have a central groove for supporting a string.

U.S. Pat. No. 3,599,524 (Jones) describes a series of nuts, each having a journalled roller, each nut being adjustably offset from one another longitudinally of the instrument fingerboard. U.S. Pat. No. 2,959,095 also shows a series of abutting rollers but with an eccentrically formed groove. U.K. Patent No. 3996 of Feb. 7, 1898 shows a grooved horizontal roller on a shaft forming string-receiving grooves.

SUMMARY OF THE INVENTION

The present invention results in a significantly improved nut and improved saddle for supporting the strings of a stringed musical instruments which allows essentially fully unrestricted movement of the strings. The nut and saddle are compact in size, durable, retain the strings at fixed positions within the nut and/or saddles, and balls roll easily when the strings are in motion. Likewise, movement of a string while being supported in a bridge saddle is allowed.

The nut is comprised of a housing with a series of countersunk pocket apertures in which a pair of ball bearings (*sometimes called herein "spherical balls" or "spherical ball members" or first and second "spheres" with respective "convex arcuate surfaces" which form a portion of an outer side of the respective spheres*) are disposed in each of the pocket apertures. Side sections of each pocket aperture are radiused to form a bearing race in which the ball bearings rotate freely within the confines of the pocket aperture. A natural curved "V" shaped (cuspidal) groove is formed between each of the ball bearings pairs in which a string is supported within the groove. The string rests in contact with ball bearing surfaces. When the strings are set into motion either by tuning the instrument or through the use of a tremolo bridge device, the strings may move forward or backward over the bearing surfaces, frictionally rotating the bearings in conjunction with the moving string.

The height or spacing of each string is controlled by the depth to which each pair of ball bearings is countersunk into the housing element. The height of each string is compensated in this manner to conform to a corresponding cambered fingerboard. Each bearing pair and corresponding string bearing are at different offset heights in order to maintain a consistent parallel distance between the strings and a cambered fingerboard.

Located at the rear edge of the nut housing element directly behind each of the bearing pockets are a series of crescent-shaped countersunk steps A series of pressure pads made of a rubber composite material are disposed in each of the steps. Each string makes contact with a pressure pad which serves to dampen excessive string vibration that may produce unwanted ringing in the portion of the string between the nut and the tuners in the absence of such a pad. Each step is countersunk to a depth which corresponds to the depth of each bearing pair in the housing element A retaining clip is employed to contain each pair of ball bearings and each corresponding pressure pad within the housing element

DETAILED DESCRIPTION OF THE DRAWINGS

Figure 1:
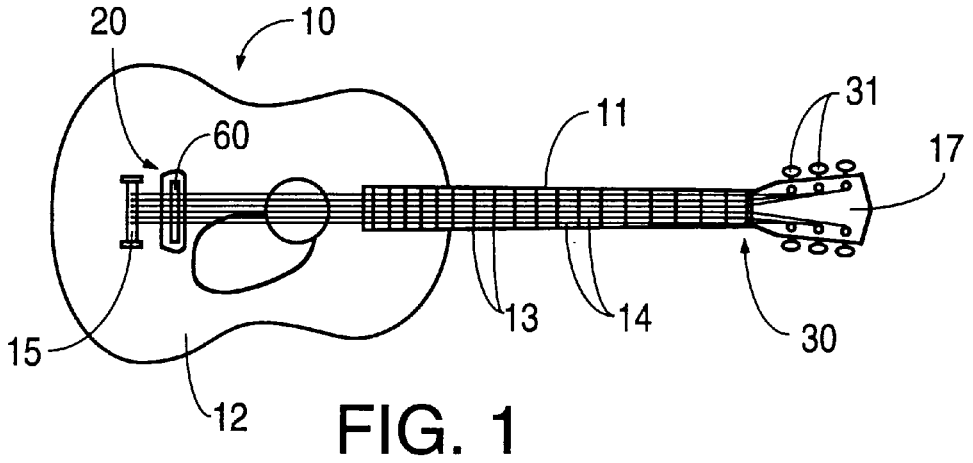
FIG. 1 is a plan view of a stringed instrument showing the location of a string support nut and string support saddle.

FIG. 1 illustrates a string instrument such as a guitar 10 having a main body end 12 oft times called a bridge end and a narrow neck 11 or fingerboard containing transverse frets 13. A series of strings 14 of different diameter are assembled end-to-end between a string securing means or bridge 15 in a ball-anchoring tailpiece or tremelo, normally including a ball fastened to the body end of a string and an anchoring pin or slot in the bridge 15 as is known in the art A saddle assembly 20, including a series of discrete saddles 60, extends under the strings adjacent to bridge 15. A nut assembly 30 extends under the strings adjacent to tuning knobs 31 extending from the neck outer end 17 *also known as "head portion"*. While not shown, the instrument may include a tremolo mechanism connected adjacent to the bridge assembly 15, pivoting movement of which varies the pitch of the strings by changing string tension.

Figure 2:
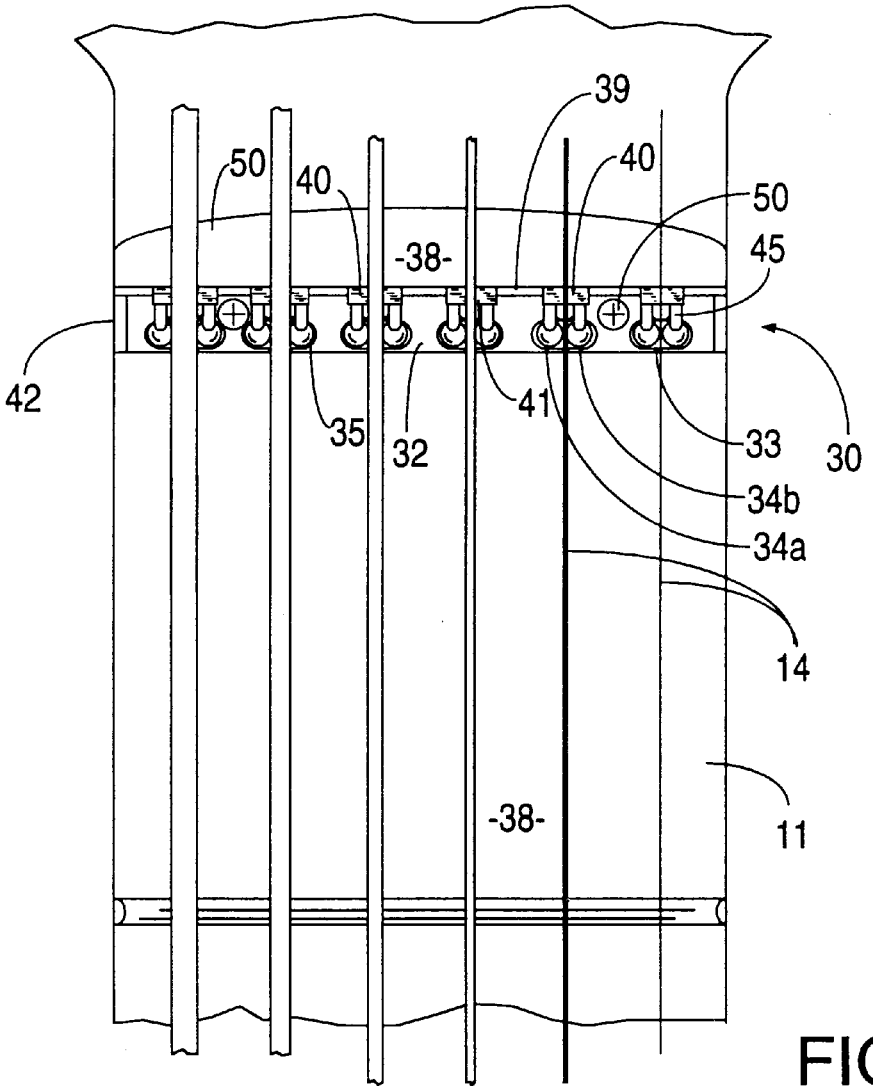
FIG. 2 is a top view of the nut assembly at the neck end of the instrument.
Figure 3:
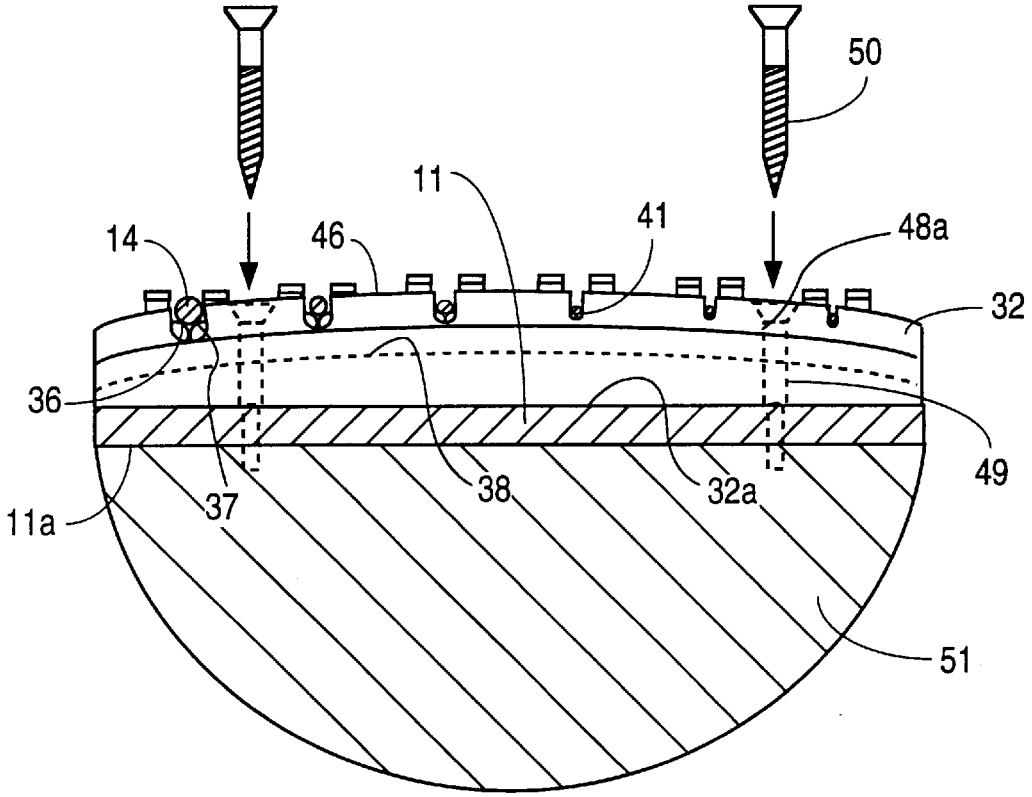
FIG. 3 is an end view of the nut assembly taken on the line 3—3 of FIG. 4.
Figure 4:
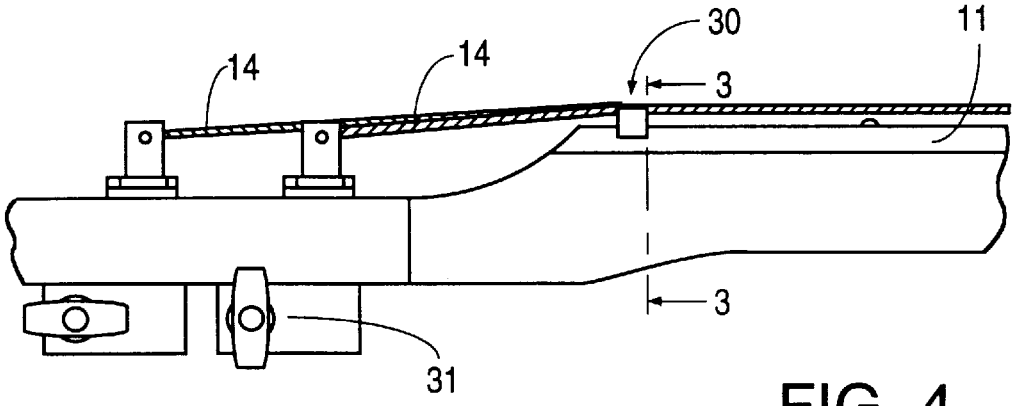
FIG. 4 is a side view of the nut assembly and typical tuner pegs.
Figure 5:
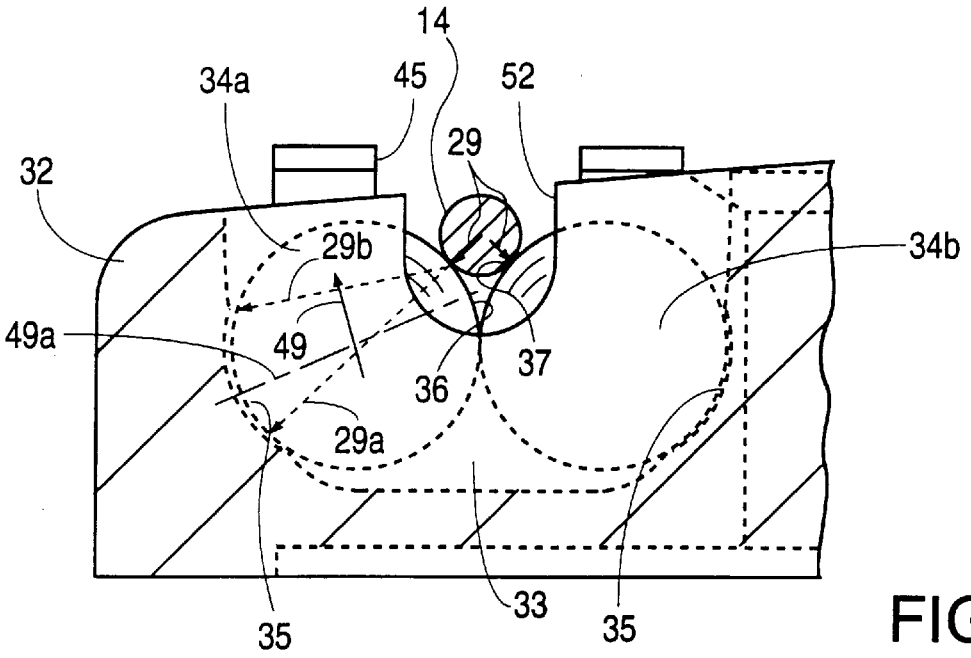
FIG. 5 is a detailed end view of a single nut assembly.

As seen in FIGS. 2, 3 and 5, the nut assembly 30 is comprised of a housing 32 with a series of countersunk pocket apertures 33 in which a pair of ball bearings 34a and 34b are disposed in each of the pocket apertures. The side sections of each pocket aperture adjacent to the bottom of the pocket aperture is radiused to form a bearing race 35 for journalling the ball bearings so that each pair of the ball bearings rotate freely within the confines of the pocket aperture. The bearing race 35 surface is finally formed by pressing a pair of ball bearings under hand or arbor press pressure into a pocket aperture slightly deforming (typically 0.005 inches) the spherically radiused walls of the aperture to conform tightly around a small portion of each ball bearing. Typically, the housing 32 is constructed of 303 stainless steel while the ball bearings are constructed of chrome steel of higher hardness, such as Rockwell 64C. The ball bearings are then snugly nested in the pocket aperture making contact with each formed race surface and both bearing surfaces at the center between the ball bearing pair. When a musical string is tensioned in the cuspidal groove 36 formed between the ball bearing pair, the tensioned string applies downward pressure (arrows 29) on the ball bearing surfaces forcing the ball bearings, respectively, downward and outward simultaneously, forming a downward vector 29a and an outward vector 29b within the pocket aperture. Vectors are shown for only one ball for illustrative purposes only and to avoid drawing clutter. For example, an 18# string tension-end-to-end might create a 4# downward force on the balls, i.e. 25% of the string tension.

The axis of rotation for each ball bearing and its corresponding bearing race center point lies between the outward and downward vectors. At the central axis 49a the downward and outward pressures created by the string are effectively equalized allowing the ball bearings to rotate freely within the pocket aperture and rotate easily when frictionally driven by a moving string. It appears from observation that the ball 34a rotates in the direction of arrow 49.

A natural curved "V" shaped (cuspidal) groove 36 (FIGS. 3 and 5) is formed between each of the ball bearing pairs in which a string 14 is supported within the groove. The string rests in contact with ball bearing surfaces 37. *As particularly seen in FIGS. 2 and 3, the plurality of strings 14 have a plurality of diameters and as seen in FIG. 5, a first arcuate surface of a first sphere 34a has a center of curvature which is spaced from a center of curvature of a second arcuate surface of a second sphere 34b by a distance greater than the diameter of at least some of the plurality of springs, as seen in FIG. 3*. When the strings are set into motion either by tuning the instrument by tuner knobs 31 (FIG. 1) or by a tuner mechanism as seen in U.S. Pat. No. 5,097,736 or through the use of a tremolo bridge mechanism (not shown) the strings may move forward or backward over the *convex arcuate* bearing surfaces 37 *of the spheres 34a and 34b*, frictionally rotating the bearings in race 35 in conjunction with the moving string.

The height or spacing of each string is controlled by the depth to which each pair of ball bearings is countersunk into the housing. The height of each string is compensated in this manner to conform to a corresponding cambered fingerboard cambered as at 38. Each bearing pair and corresponding string supported thereby are at different offset heights in order to maintain a consistent parallel distance between the strings and the cambered fingerboard.

Located at the rear edge 39 of the housing 32 directly behind each of the bearing pocket apertures 33 are a series of crescent shaped countersunk steps 40. A series of pressure pads 41 made of a rubber composite material such as neoprene, or a silicone/Teflon plastic material, are disposed in each of the steps. Each string 14 makes contact with a pressure pad 41 which serves to dampen excessive string vibration that may otherwise produce unwanted ringing in the portion of the string between the nut assembly 30 and the tuners 31 in the absence of such a pad. Each step 40 is countersunk to a depth which corresponds to the depth of each pair of ball bearings in the housing.

As seen in FIG. 5, the housing includes a series of pairs of transverse edge slots 52 on opposite sides of the housing and aligned with cuspidal groove 36 through which each string freely passes each string having a diameter less than the width of a respective slot.

Figure 6:
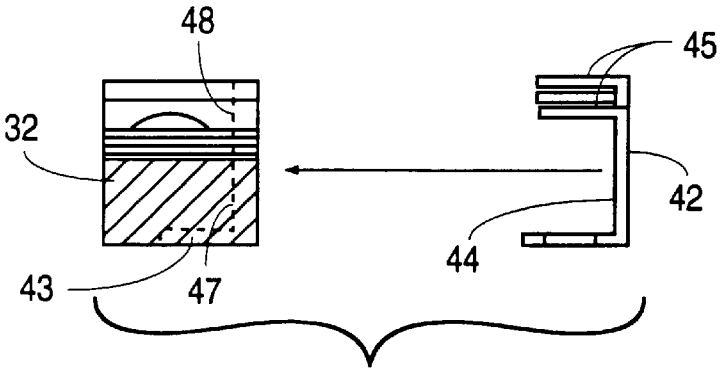
FIG. 6 is a detailed side view of the nut assembly.
Figure 7:
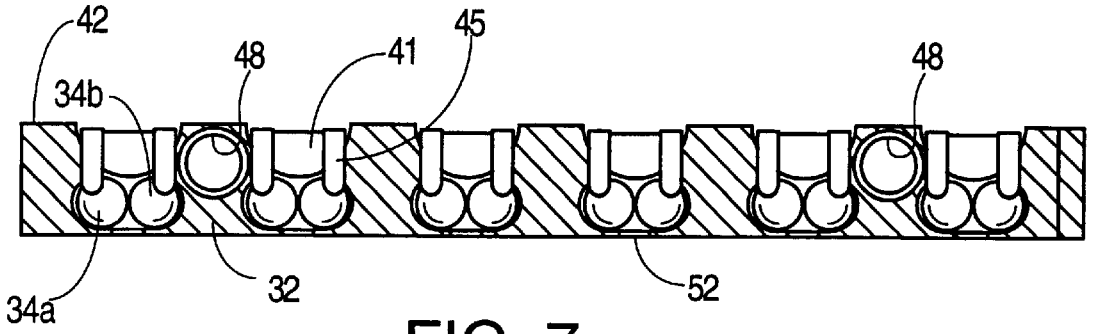
FIG. 7 is a detailed partial cross-sectional top view of the nut assembly.
Figure 8:
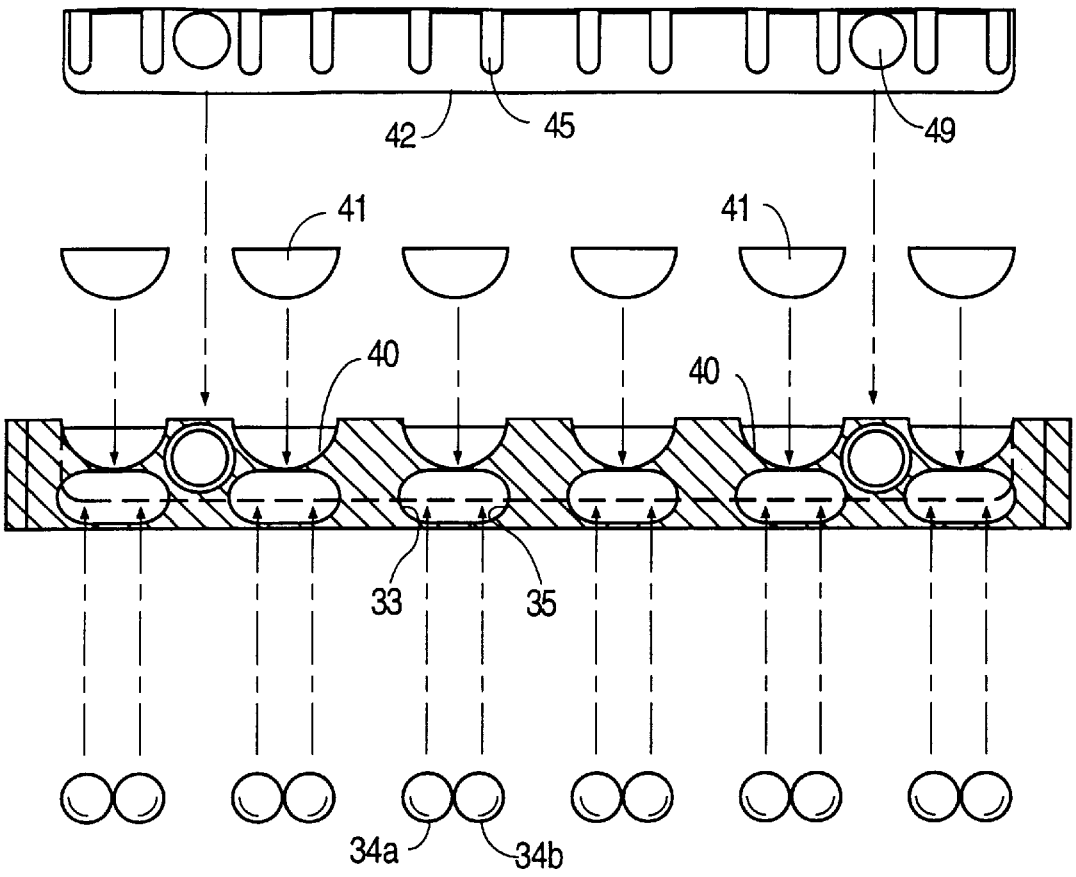
FIG. 8 is an exploded view of the nut assembly.

A means for retaining the balls in the housing are provided in the form of a retaining clip 42, shown in detail in FIGS. 6,7, and 8. Clip 42 is employed to retain each pair of ball bearings and each corresponding pressure pad within the housing 32. The retaining clip 42 surrounds the housing on three sides making first contact in a coplanar slot 43 at the base of the housing 32. The retainer clip then advances upward with a portion 44 making contact with the rear most wall of the housing element which contains a series of coplanar slots 48 into which the retainer clip is fitted. The retainer clip then extends forwardly with a series of tab-like extensions 45 over the top surface 46 of the housing 32. The tab *extensions 45 provide a means by which the ball bearings* 34a and 34b and pressure pads 41 are retained in place within the housing. Tab [extension] *extensions* in the preferred embodiment do not contact the ball bearings. The height of each pair of extension tabs 45 is controlled to conform to the cambered profile on the curved top surface 46 of the housing.

The housing 32 and the retainer clip 42 are joined together in one assembly by means of a double-sided adhesive strip 47 (FIG. 6). The adhesive strip 47 may be a double sided cloth tape or an adhesive material such as rubber cement applied to the base and/or side of the housing. The retainer clip is fitted onto the housing engaging the adhesive strip at the base of the housing, the clip being temporarily and fixedly positioned on the housing and held fast to the housing with the adhesive strip.

Within the housing are located a pair of vertical bore holes 48a (FIG. 3) that extend through the housing which align with a pair of corresponding through holes 49 in the retainer clip. A corresponding pair of wood screws 50 are inserted within the bore holes which serve to fasten the nut housing 32 to the fingerboard 11 of the instrument and in turn to the main stock 51 of the neck. Surface 11a is the bottom of the fingerboard. Surface 32a is the bottom of nut housing 32. In FIG. 3 the cambered surface 38 is shown by dashed line. In the process of fastening the nut to the fingerboard, the retainer clip becomes firmly clamped between the nut housing and the surface of the fingerboard securing the entire nut assembly 30 to the fingerboard 11 of the instrument.

Figure 9:
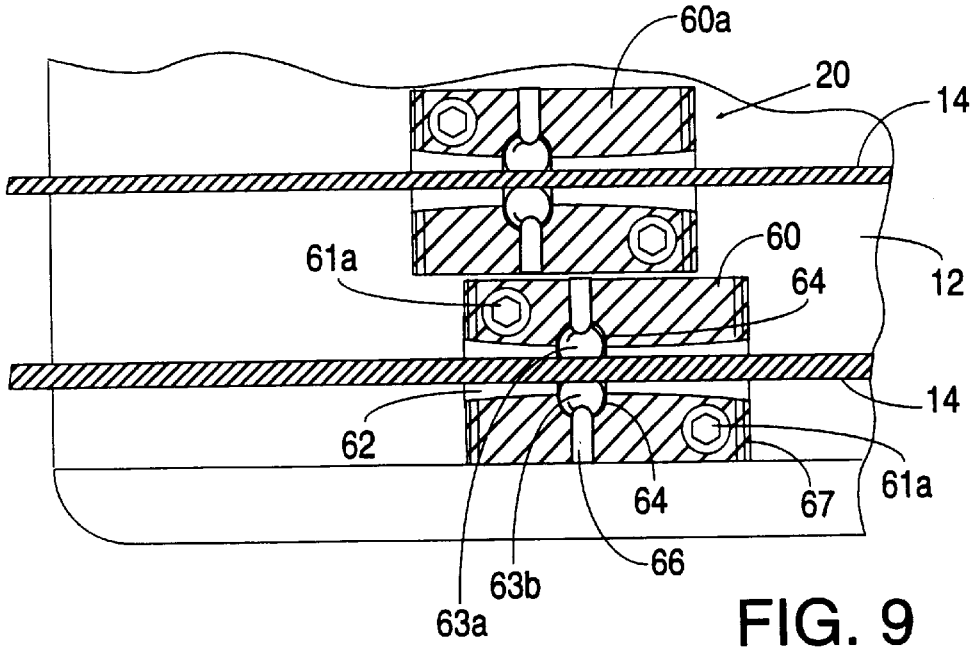
FIG. 9 is a top partial view of the saddle assembly.

FIG. 9 illustrates the application of the ball bearings string support of the invention to saddle assembly 20. A series of string support saddles 20 *are* located at the bridge end 12 of a guitar. The saddles are fixedly positioned on a bridge end 12. Each saddle comprises a housing 60 within which is provided a pair of adjusting screws 61a and 61b and a central channel 62 through which a string 14 may pass. A pair of ball bearings 63a and 63b are disposed in a pocket aperture 64 within housing 60. A retaining clip 66 surrounds the housing being seated in the countersunk slot 67 for the purpose of holding ball bearings 63a and 63b in place in the housing 60. Duplicate housings 60a may be provided offset from each other along the instrument longitudinal axis to form the assembly of normally six saddles, one for each string.

The above description of embodiments of this invention is intended to be illustrative and not limiting. Other embodiments of this invention will be obvious of those skilled in the art in view of the above disclosure

I claim:

1. A string support for a string instrument having a top surface including a neck end, a fingerboard extending along said neck end, a bridge end and strings extending from a tuning mechanism on said [bridge] *neck* end and along said neck end, said string support comprising:

a housing extending transversely across said top surface and spaced from the tuning [mechanism] *mechanisms*;

series of spaced pocket apertures in said housing;

a pair of spherical balls positioned within each of said pocket apertures;

means for journalling each pair of spherical balls in said pocket apertures such that each pair of spherical balls rotate freely within each said pocket aperture, and wherein a cuspidal groove formed between each pair of spherical balls supports a string; and means for retaining each pair of spherical bails in a respective one of said pocket apertures.

2. The string support as set forth in claim 1 further comprising means in said pocket apertures for controlling the depth to which each pair of said spherical balls are journalled in each of said pocket apertures such that the height of a string above said fingerboard is fixed.

3. The string support as set forth in claim 2 in which said fingerboard is cambered and each pair of spherical balls are at various offset heights in various ones of said pocket apertures such that a fixed distance is provided between each spring and the cambered fingerboard.

4. The string support as set forth in claim 1 wherein said housing includes a pair of transverse edge grooves aligned with each cuspidal groove, each of said edge grooves have a width greater than the diameter of an associated string.

5. The string support as set forth in claim 1 wherein said string support is a nut, further including a countersunk step in said housing juxtaposed to and aligned with each of said pocket apertures; and a vibration dampening pad in each of said steps such that each of the strings rests on a corresponding one of said pads to dampen vibration of the spring between the cuspidal groove and the tuning mechanism.

6. The string support as set forth in claim 5 in which each of said steps are crescent-shape and extend under and in contact with a corresponding string adjacent the point of entry of the corresponding string from the tuning mechanism-into the cuspidal groove.

7. The string support as set forth in claim 1 wherein the means for journalling comprises dual-ball bearing race surfaces at the sides of each pocket aperture encompassing a portion of each of said pair of spherical balls.

8. The string support as set forth in claim 1 wherein the means for retaining comprises a retaining clip mountable on a side exterior edge of said housing.

9. The string support as set forth in claim 8 wherein the retaining clip is C-shaped in cross-section and includes tab extensions extending over said housing for retaining the pairs of said spherical balls.

10. The string support as set forth in claim 1 wherein said string support is a bridge saddle at said bridge end, said housing being fixed on said bridge end.

11. The string support as set forth in claim 1 wherein said string support is a string nut, said string nut being fixed on said neck end.

12. The string support as set forth in claim 11 wherein a second string support, including others of said pocket apertures and others of said pairs of spherical balls are provided as a bridge saddle on said bridge end.

*13. A string support for a stringed instrument having a top surface including a neck end, a fingerboard extending along said neck end, a bridge end and strings extending from a tuning mechanism on said neck end and along said neck end to said bridge end, said string support comprising:*

*a housing extending transversely of said top surface and spaced from the tuning mechanism;*

*a pocket aperture in said housing;*

*a pair of spherical balls positioned within the pocket aperture;*

*means for journalling the pair of spherical balls in said pocket aperture such that the pair of spherical balls frictionally rotate within the pocket aperture, and wherein a cuspidal groove formed between the pair of spherical balls supports a string; and*

*means for retaining the pair of spherical balls in the pocket aperture.*

*14. A string support according to claim 13, wherein the housing is provided with a series of spaced pocket apertures, a pair of spherical balls being positioned within each pocket aperture.*

*15. The string support as set forth in claim 14 wherein said string support is a string nut, said string nut being fixed on said neck end.*

*16. The string support as set forth in claim 13 wherein said string support is a bridge saddle at said bridge end, said housing being fixed on said bridge end.*

*17. A string support for use in a stringed musical instrument including a plurality of strings comprising:*

*a first spherical ball member for engaging a first location on a first surface of a string;*

*a second spherical ball member for engaging a second location on a second surface of the string, said string engaging said first and second spherical members in a cuspidal groove between said first and second spherical ball members; and*

*means for supporting said first and second spherical ball members.*

*18. A stringed support as set forth in claim 17 wherein said means for supporting includes means for frictionally rotating said first and second spherical ball members.*

*19. A string support as set forth in claim 18 wherein said means for frictionally rotating is operable by an axial movement of said string.*

* * * * *